(12) United States Patent
Hilker et al.

(10) Patent No.: US 12,021,356 B2
(45) Date of Patent: Jun. 25, 2024

(54) HIGH-VOLTAGE DEVICE AND METHOD FOR ASCERTAINING THE RISK OF CONDENSATION IN CABINETS IN A HIGH-VOLTAGE DEVICE OF THIS KIND

(71) Applicant: Siemens Energy Global GmbH & Co. KG, Munich (DE)

(72) Inventors: Thomas Hilker, Stahnsdorf (DE); Robert Knuth, Berlin (DE); Matthias Heinecke, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 352 days.

(21) Appl. No.: 17/599,022

(22) PCT Filed: Feb. 28, 2020

(86) PCT No.: PCT/EP2020/055243
§ 371 (c)(1),
(2) Date: Sep. 28, 2021

(87) PCT Pub. No.: WO2020/193069
PCT Pub. Date: Oct. 1, 2020

(65) Prior Publication Data
US 2022/0190563 A1 Jun. 16, 2022

(30) Foreign Application Priority Data
Mar. 28, 2019 (DE) ...................... 10 2019 204 300.3

(51) Int. Cl.
*H02B 1/28* (2006.01)
*G01K 3/14* (2006.01)
(Continued)

(52) U.S. Cl.
CPC ................. *H02B 1/28* (2013.01); *G01K 3/14* (2013.01); *G08B 21/182* (2013.01); *H05K 5/0213* (2013.01); *H02B 13/045* (2013.01)

(58) Field of Classification Search
CPC ...... H02B 1/28; H02B 13/045; H02B 13/065; H05K 5/0213; G01K 3/14; G08B 21/182
See application file for complete search history.

(56) References Cited

U.S. PATENT DOCUMENTS 6,161,765 A * 12/2000 Kay ..................... H05K 5/0212
236/44 A
2009/0014548 A1 * 1/2009 Criss .................... H05K 5/0213
236/44 C
(Continued)

FOREIGN PATENT DOCUMENTS

CN 204028729 U 12/2014
CN 104833022 A 8/2015
(Continued)

*Primary Examiner* — Joseph H Feild
*Assistant Examiner* — Sharmin Akhter
(74) *Attorney, Agent, or Firm* — Laurence A. Greenberg; Werner H. Stemer; Ralph E. Locher

(57) ABSTRACT

A method ascertains the risk of condensation in an enclosure of a high-voltage device. The interior temperature in the enclosure is ascertained using an interior temperature sensor arranged in the enclosure, thereby obtaining interior temperature values TI. An exterior temperature of the enclosure is ascertained using an exterior temperature sensor arranged outside of the enclosure, thereby obtaining exterior temperature values TA. The interior temperature values TI and the exterior temperature TA values are transmitted to a data processing unit. The data processing unit ascertains a temperature difference value TD by calculating the difference between the interior temperature value TI and the exterior temperature values TA based on TD=TI−TA. The data (Continued)

processing unit generates a warning signal if the temperature difference value TD lies below 3° C.

10 Claims, 2 Drawing Sheets

(51) Int. Cl.
   *G08B 21/18* (2006.01)
   *H05K 5/02* (2006.01)
   H02B 13/045 (2006.01)

(56) References Cited

U.S. PATENT DOCUMENTS

| | | | |
|---|---|---|---|
| 2016/0363940 A1 | 12/2016 | Myller et al. | |
| 2019/0293311 A1* | 9/2019 | Kohashi | F24F 11/30 |
| 2019/0310137 A1* | 10/2019 | Pop | H04L 12/66 |

FOREIGN PATENT DOCUMENTS

| | | | | |
|---|---|---|---|---|
| CN | 105509818 A | * | 4/2016 | G01D 21/02 |
| CN | 105509818 A | | 4/2016 | |
| CN | 106973560 A | | 7/2017 | |
| DE | 20220204 U1 | | 4/2004 | |
| DE | 202015102930 U1 | | 6/2015 | |
| EP | 3088984 B1 | | 12/2017 | |
| JP | S62190455 A | | 8/1987 | |

\* cited by examiner

HIGH-VOLTAGE DEVICE AND METHOD FOR ASCERTAINING THE RISK OF CONDENSATION IN CABINETS IN A HIGH-VOLTAGE DEVICE OF THIS KIND

FIELD AND BACKGROUND OF THE INVENTION

The invention relates to a high-voltage device and a method for ascertaining the risk of condensation in the cabinet of a high-voltage device of this kind.

Switchgear and drive cabinets of high-voltage devices, such as for example gas-insulated switchgears or circuit breakers, incorporate heaters in order to protect the electronics and electromechanical components arranged in the cabinets from condensation water and low temperatures of less than −30° C. If the heating fails, there is the risk of the gaseous water contained in the air condensing and leading to failure of the electronics and/or control.

The functionality of the heating of such a cabinet is not normally checked. It is known practice to monitor the heating current in order to detect a risk of condensation in that way. Furthermore, expensive monitoring devices are available on the market as retrofit solutions, said devices recording the cabinet interior temperature, inter alia. A disadvantage of these previously known solutions is that the monitoring devices need to be installed in situ and read in a complex manner.

DE 20 220 204 U1 discloses a heating device for a control cabinet of a high-voltage circuit breaker.

SUMMARY OF THE INVENTION

It is an object of the invention to simplify ascertainment of the risk of condensation in the case of the high-voltage device cited at the outset and the method cited at the outset.

The invention achieves this object by means of a method of the type cited at the outset, in which an interior temperature sensor arranged in the cabinet is used to ascertain the cabinet interior temperature by obtaining interior temperature values $T_I$, an exterior temperature sensor arranged outside the cabinet is used to ascertain the exterior temperature by obtaining exterior temperature values $T_A$, the interior temperature values $T_I$ and the exterior temperature values $T_A$ are transmitted to a data processing unit, the data processing unit calculates the difference between the interior temperature values $T_I$ and the exterior temperature values $T_A$ to ascertain a temperature difference value $T_D$ according to $$T_D = T_I - T_A,$$

wherein the data processing unit generates a warning signal if the temperature difference value $T_D$ is below 3 degrees Celsius.

The invention also achieves this object by means of a high-voltage device of the type cited at the outset, wherein the high-voltage device has a cabinet, in which there is provision for a heating device, an interior temperature sensor arranged in the cabinet, an exterior temperature sensor arranged outside the cabinet in proximity thereto, a communication unit connected to the interior temperature sensor and the exterior temperature sensor via a short-range communication connection, and a data processing unit that is connectable to the communication unit and is designed to carry out the aforementioned method.

The invention provides a method and a high-voltage device that allow convenient monitoring of the risk of condensation in a cabinet of a high-voltage device. According to the invention, the cabinet interior temperature is recorded by an interior temperature sensor that is expediently arranged in said cabinet. The interior temperature sensor should be arranged as far as possible away from heat sources that may be present in the cabinet.

Besides the interior temperature sensor, the invention has provision for a further temperature sensor that is arranged outside the cabinet and ascertains the exterior temperature, the resultant exterior temperature values likewise being transmitted to the data processing unit. The data processing unit forms the difference between the interior temperature values $T_I$ and the simultaneously recorded exterior temperature values $T_A$ and in that way calculates the temperature difference value $T_D$. There is no provision for such temperature difference ascertainment in the previously known methods.

The temperature difference can be used to deduce the risk of the occurrence of condensation water in the cabinet quickly and with high reliability. In particular, the data processing unit generates a warning signal if the temperature difference $T_D$ is less than 3 degrees Celsius or 3 degrees Kelvin. The warning signal renders complex reading of the sensors in situ superfluous. The nature of the warning signal and the way in which it is delivered is fundamentally arbitrary for the purposes of the invention. As such, for example a text message such as e.g. an SMS or an email can be produced and transmitted to a monitoring station of the energy supply grid or to a mobile phone of a user.

Furthermore, online applications also allow a warning signal to be configured by means of a specific color for the high-voltage device when visually displaying the operating state of the high-voltage device. As such, for example a high-voltage device without any risk of condensation can be depicted in green if the temperature difference between the interior and exterior temperatures is greater than 3 degrees Kelvin. In other words, if the interior temperature is at least 3 degrees Kelvin greater than the exterior temperature then there is no risk of condensation. Warm air can hold more water than colder air. In other words, air entering the cabinet from outside has a lower relative humidity. If the threshold value of 3 K or 3° C. is not reached, however, there is the risk of the gaseous water contained in the air condensing. A high-voltage device that has such a cabinet would then be depicted in red, for example.

Expediently, the data processing unit ascertains the change in the temperature difference $T_D$ as a function of time. In this case, it is expedient if the data processing unit has a storage unit that can be used to continually store the measured data, that is to say the exterior temperature values $T_A$ and the interior temperature values $T_I$. Each stored temperature value is assigned a time value. In other words, the temperature measurement for the purposes of the invention takes place as a function of time.

According to one advantageous embodiment of the method according to the invention, the data processing unit detects the state of an open cabinet door if the temperature difference value $T_D$ drops to 3 degrees Celsius within 1-3 minutes. On the basis of the time-dependent recording of the temperature difference value $T_D$, it is possible to detect whether the door of the cabinet has been opened, for example for an inspection of the electronics performed during maintenance or simply as a result of the cabinet door having burst open unintentionally. In this case, it is assumed that an open cabinet door causes a rapid fall in the temperature difference values Tn. If this kind of rapid decrease in the temperature difference is detected, the invention results in the conclusion being drawn that the cabinet door is open.

This event is equated with the state of an open cabinet door. Normally, that is to say when the heating device is functioning and the cabinet door is closed, the temperature difference values $T_D$ are in the range between 5 degrees and 20 degrees Celsius.

According to an expedient further development of the method according to the invention, the number of states of an open cabinet door within a period of time is ascertained. According to this advantageous further development of the invention, the frequency of door openings can be detected. This is advantageous in respect of the reliability of the operation of the high-voltage device.

If the temperature difference value $T_D$ falls slowly, that is to say more slowly than 5 degrees within 3 minutes, on the other hand, the invention results in the conclusion being drawn that the heating of the cabinet has failed and a corresponding warning signal being delivered. The warning signal is transmitted to a user in the form of a text message, for example, and the user then recognizes the failure of the heating and can subsequently take appropriate measures.

Expediently, the interior temperature sensor is arranged away from the airflow of the cabinet ventilation openings. An airflow can distort the result of the interior temperature measurement.

According to a further advantageous variant of the invention, the data processing unit generates a warning signal indicating that the additional heating device of the cabinet has failed if the interior temperature value $T_I$ becomes less than −30 degrees Celsius for exterior temperature values $T_A$ of less than −33 degrees Celsius. Failure of the additional heating device in the cabinet of the high-voltage device is critical at low temperatures because the previously warm air can hold more humidity than colder air. If the warm air cools quickly, therefore, the occurrence of condensation water is likely, which means that it is necessary to react quickly here.

According to a further development that is expedient in this regard, the interior temperature sensor and the exterior temperature sensor are connected to a communication unit via a short-range communication connection, the communication unit being connected to the data processing unit via a long-range communication connection and the data processing unit being a data processing cloud. The communication unit is arranged on the high-voltage device or in proximity thereto, that is to say no more than 100 meters away. According to this advantageous further development, there is provision for a communication unit, for example a communication box, that has at least one analog and at least one digital input. Naturally, there may also be provision for multiple analog and/or digital inputs. In every case, the communication unit is connected both to the interior temperature sensor and to the exterior temperature sensor via the short-range communication connection. In this way, both sensors can transmit their measured values and/or values derived from the measured values to the communication unit.

The communication unit has for example a processor, for example a main processor and possibly a secondary processor, and also a storage unit that can be used to store preprocessed measured values and/or preprocessed values derived from the measured values. As such, it is possible for example to average the incoming values and to store the averaged values locally on the storage unit of the communication unit. The communication unit is in turn connected to a data processing cloud via a long-range communication connection.

A data processing cloud is intended to be understood here to mean an arrangement containing one or more data storage devices and one or more data processing devices that is able to be designed to carry out arbitrary data processing processes by means of suitable programming. The data processing devices are usually universal data processing devices, such as for example servers, that initially have no kind of specific interpretation in respect of their design and their programming. Only programming that has been performed can enable the universal data processing device to perform specific functions.

If the data processing cloud has multiple individual components, these are connected to one another in a suitable manner for the purpose of data communication, for example by a communication network. A data processing cloud can be supplied with arbitrary data for data storage and/or processing. The data processing cloud itself makes the stored data and/or the events of the stored data processing available in turn to other devices, for example to computer stations, laptops or smartphones connected to a data processing cloud. A data processing cloud can be provided by a computer center or multiple networked computer centers, for example. Normally, the data processing cloud is arranged physically remotely from the components of an energy supply grid, in particular from the high-voltage devices installed therein.

The communication unit is connected to the data processing cloud via a so-called long-range communication connection. To make said connection, the communication unit has a long-range communication device, such as for example a mobile radio device based on the GPRS or UMTS standard. This communication device is used to set up a long-range communication connection, preferably an IP-based data connection, to the data processing cloud. In this case, for example a provider of a mobile radio service or a telecommunications provider may be interposed and the long-range communication connection can be made at least partly via a communication network of this provider and/or at least partly via the Internet. Only very little configuration or parameterization effort is then incurred for making the connection. No further effort is required from the individual communication unit apart from the information needed for setting up the long-range communication connection, for example regarding the installation of a SIM card of the telecommunications provider.

The temperature sensors are connected to the communication unit via a short-range communication connection for the purposes of the invention. The short-range communication connection can be a simple cable, for example. As a departure therefrom, the short-range communication connection is for example a ZigBee, Bluetooth, wireless, Ambus or WiFi communication connection. The short-range communication connection extends over a connection distance of no more than 100 meters.

A high-voltage device for the purposes of the invention is designed for the operation of a high-voltage grid, for example an energy supply grid, that is to say for an operating voltage of between 1 kV and 1000 kV, in particular 50 kV and 800 kV. The high-voltage grid is preferably an AC voltage grid. A DC voltage grid and/or a combination of AC and DC voltage grids are also possible for the purposes of the invention, however.

Any temperature sensors are possible as sensors for the purposes of the invention; it is naturally also possible for specifically adapted temperature sensors to be used for the purposes of the invention.

Expediently, the communication unit has a local storage unit and a processor, the interior temperature values and exterior temperature values transmitted by the temperature sensors being stored locally on the storage unit.

For the purposes of the invention, a high-voltage device is for example a circuit breaker, a switch disconnector, a transformer, a converter, a matrix switch, a DC voltage switch or the like.

Expediently, the communication unit has an antenna for position determination. The antenna allows the geographical location of the respective communication unit and the high-voltage device connected thereto to be determined. Methods for position determination are known to a person skilled in the art. In this regard, reference is made to the so-called Global Positioning System, Galileo or the like.

According to a further development that is expedient in this regard, the communication unit has a long-range communication device and is connectable to the data processing unit via a long-range communication connection.

Further expedient configurations and advantages of the invention are the subject of the description of exemplary embodiments of the invention that follows with reference to the figures of the drawing, in which identical reference signs indicate identically acting components and in which

DETAILED DESCRIPTION OF THE INVENTION

Figure 1:
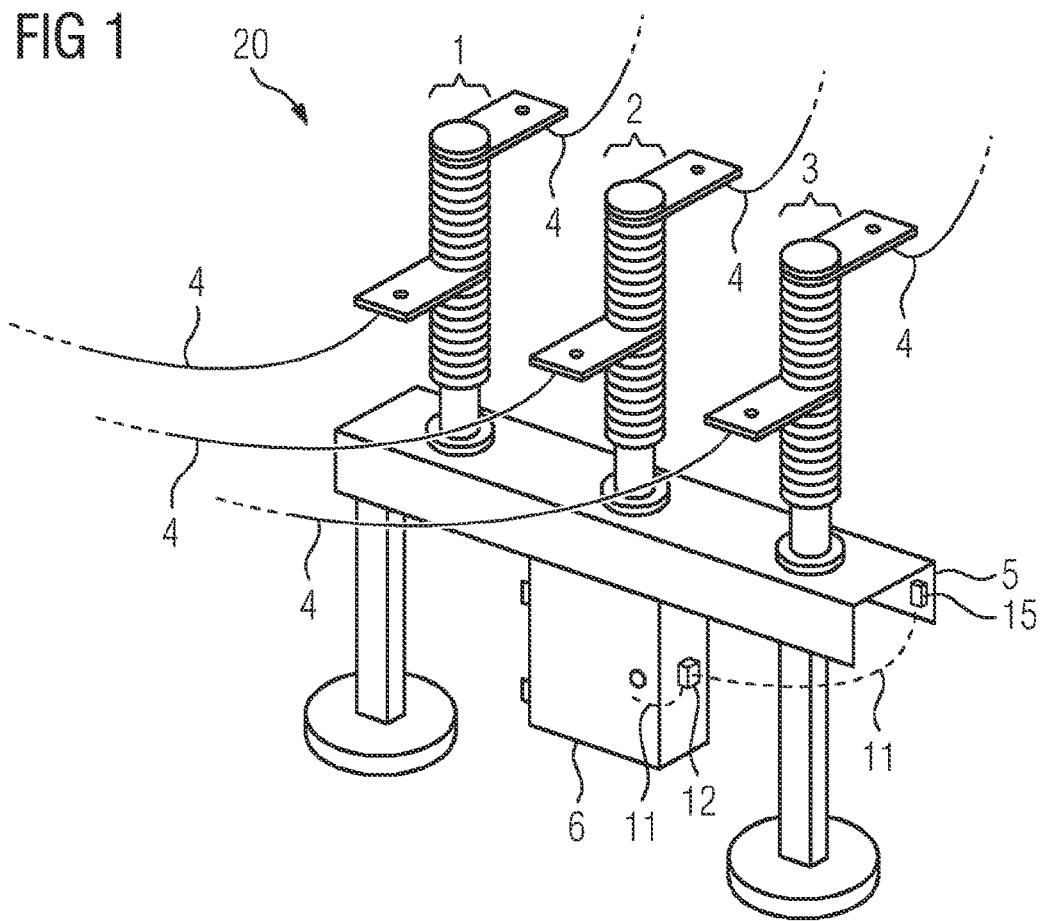
FIG. 1 schematically shows an exemplary embodiment of the high-voltage device according to the invention, FIG. 2 schematically shows a switchgear cabinet of the high-voltage device shown in FIG. 1, and FIG. 3 schematically shows the high-voltage device shown in FIG. 1 in conjunction with a data processing cloud to illustrate the method according to the invention.

FIG. 1 shows a high-voltage device 20 embodied as a high-voltage circuit breaker. The high-voltage circuit breaker has three switch terminals 1, 2, 3. Each switch terminal 1, 2, 3 is equipped with an upper and a middle outdoor connection, each of which is used to connect an air-insulated connecting line 4. The outdoor connections are spaced apart from one another by an elongate hollow insulator column, the interior of the insulator column having a permanently installed fixed contact arranged in it that has a moving contact opposite it in the longitudinal direction. By introducing a lifting movement into the moving contact it is possible for the contact pieces in contact with one another to be separated from one another, or vice versa. When the contact pieces of the switch terminals 1, 2, 3 are in contact with one another, current can flow via the respective switch terminal 1, 2, 3. When the contact pieces are separate from one another, that is to say when the switch terminals 1, 2, 3 are open, the current path via the switch terminals 1, 2, 3 is broken.

All of the insulator columns are mounted on a shared support frame 5 that is firmly supported on the ground by way of expedient feet. Beneath the support frame 5 it is possible to see a switchgear cabinet 6, the cabinet door of which is closed in FIG. 1.

Figure 2:
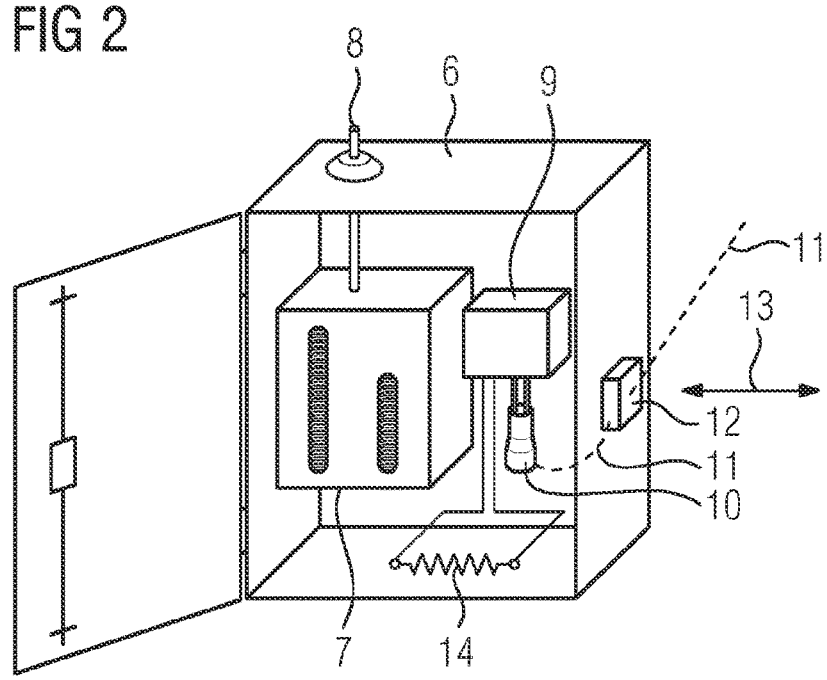

FIG. 2 shows the switchgear cabinet 6 with the cabinet door open. It can be seen that the switchgear cabinet 6 contains a drive device 7. The interior of the drive unit 7 contains a switch-on spring and a switch-off spring, which are illustrated schematically in FIG. 2. If the switch is switched on and if a lock on the tensioned switch-off spring is released, the switch-off spring relaxes. The drive movement produced thereby is introduced into the moving contact of the respective switch terminal 1, 2, 3 by way of a kinematic chain 8. The switch 20 is now switched off, which means that a flow of current via the contacts of the switch terminals 1, 2, 3 is prevented. To switch on the switch 20, the tensioned switch-on spring in the drive cabinet 7 is relaxed and this drive movement is introduced into the moving contacts, as a result of which each moving contact is brought into contact with the respective fixed contact. A control device 9 arranged in the switchgear cabinet 6 is used to trigger the respective switching process, said control device being connected to the drive device 7 and designed to release the respective lock, as a result of which the switch-on or switch-off spring is released and relaxes.

An interior temperature sensor 10 can also be seen in the switchgear cabinet 6, said interior temperature sensor being connected to a communication unit 12 via a short-range communication connection 11. The communication unit 12 is connected to a data processing cloud, which is not depicted in FIG. 2, via a long-range communication connection 13, which is indicated only schematically. To avoid condensation water in the switchgear cabinet 6, there is provision in the cabinet 6 for a heating device 14 that causes an increase in the interior temperature in the cabinet 6, as a result of which the interior temperature is greater than the exterior temperature.

Referring again to FIG. 1, it is possible to see that the high-voltage circuit breaker 20 has an exterior temperature sensor 15 that is likewise connected to the communication unit 12 on the switchgear cabinet 6 via a short-range communication connection 11. The short-range communication connection 11 between the interior temperature sensor in the interior of the cabinet 6, which is not representatively depicted there, and the communication unit 12 is indicated schematically in FIG. 1.

The interior temperature sensor 10 records the interior temperature as a function of time, the analog measurement signal from the interior temperature sensor 10 being sampled and samples being digitized by obtaining interior temperature measured values $T_I$. The digitized temporally resolved interior temperature measured values $T_I$ are transmitted to the communication unit 12 via the short-range communication connection 11. The communication unit 12 has at least one processor and a storage unit, the incoming interior temperature values $T_I$ and incoming temporally resolved exterior temperature values $T_A$ expediently being able to be averaged.

Figure 3:
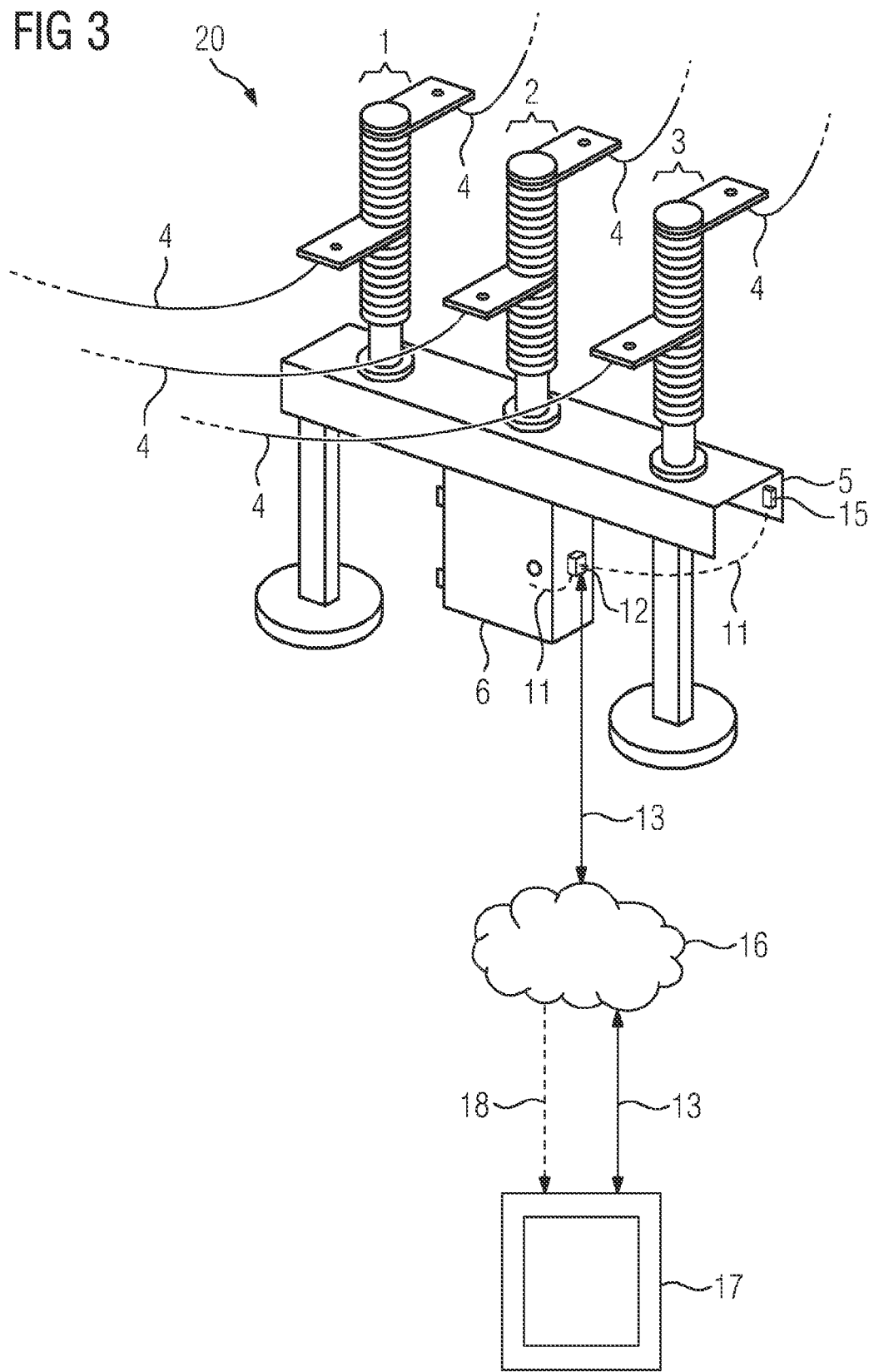

FIG. 3 shows the high-voltage circuit breaker 20 and a data processing cloud 16, which is connected to the communication unit 12 via said long-range communication connection 13.

It is also possible to see a user tablet 17 in FIG. 3, said user tablet likewise being connected to the data processing cloud 16 via a long-range communication connection 13. The data processing cloud 16 receives the interior temperature values $T_I$ and the exterior temperature values $T_A$ from the communication unit 12, the measured values each having a firmly assigned time value. The data processing cloud 16 forms the temperature difference value $T_D$ by deducting the exterior temperature value $T_A$ from the interior temperature value $T_I$, which is higher on account of the heating device. If the temperature difference value $T_D$ thus formed drops below a threshold value of 3 degrees Celsius or 3 degrees Kelvin, there is a risk of condensation. The data processing cloud 16 then generates a warning signal 18, which is transmitted to the user tablet 17 in this case. After receiving the warning signal 17, e.g. the user uses his tablet 17 to connect to the data processing cloud 16 via the long-range communication connection 13. This is accomplished by inputting so-called user data or login data, which, in the exemplary embodiment shown, comprise a user name and a password associated with the user name. After the user data have been input, the connection between the data processing cloud 16 and the user tablet 17 is made, the data processing cloud 16 producing a visual display, for example, that can be used to representatively display the operating state of an energy supply grid or specifically the high-voltage circuit breaker 20 shown in FIG. 1.

The temperature difference value $T_D$ can therefore be used to indicate a risk of condensation. Furthermore, the temperature difference value $T_D$ measured in temporally resolved fashion also allows specific events or states to be detected. As such, the invention involves the conclusion being drawn that the cabinet door is open if the temperature difference value $T_D$ drops rapidly and falls from a value that is almost constant over time, for example 10 degrees Celsius, to 3 degrees Celsius within 2 minutes. This kind of rapid cooling suggests that the cabinet door is open.

If the decrease in the temperature difference value $T_D$ from 10 degrees Celsius to 2 degrees Celsius is slower and takes 10 minutes, for example, it is possible to rule out the possibility of the cabinet door being open. In this case, the functionality of the heating device 14 is doubtful instead, which means that a corresponding warning signal 18 is sent to the user tablet 17.

Low exterior temperatures of less than −33 degrees necessitate an additional heating device that assists the heating device 14 in the cabinet 6. The invention allows detection of whether this additional heating device is faulty. This is the case if the interior temperature value drops below −30 degrees Celsius for exterior temperatures of less than −33 degrees Celsius. If the data processing cloud 16 detects such a fall in the interior temperature value $T_I$, a corresponding warning signal is delivered.

The invention claimed is:

1. A method for ascertaining a risk of condensation in a cabinet of a high-voltage device, which comprises the steps of:
    ascertaining a cabinet interior temperature in the cabinet by obtaining interior temperature values TI by an interior temperature sensor disposed in the cabinet;
    ascertaining an exterior temperature of the cabinet by obtaining exterior temperature values TA by an exterior temperature sensor disposed outside the cabinet;
    transmitting the interior temperature values TI and the exterior temperature values TA to a data processor;
    calculating, via the data processor, a difference between the interior temperature values TI and the exterior temperature values TA to ascertain a temperature difference value TD according to TD=TI−TA; and
    generating, via the data processor, a warning signal if the temperature difference value TD is below 3 degrees Celsius, wherein the data processor detects a state of an open cabinet door if the temperature difference value TD drops below 3 degrees Celsius within 1 to 3 minutes.

2. The method according to claim 1, which further comprises ascertaining, via the data processor, a change in the temperature difference values TD as a function of time.

3. The method according to claim 1, which further comprises ascertaining a number of states of the open cabinet door within a predefined period of time.

4. The method according to claim 1, wherein:
    the interior temperature sensor and the exterior temperature sensor are connected to a communication unit via a short-range communication connection;
    the communication unit being connected to the data processor via a long-range communication connection; and
    the data processor is a data processing cloud.

5. The method according to claim 4, wherein the communication unit has a local storage unit and a processor, the interior temperature values TI and exterior temperature values TA transmitted by the interior and exterior temperature sensors are stored locally on the local storage unit.

6. The method according to claim 4, wherein the communication unit has an antenna for position determination.

7. A high-voltage device, comprising:
    a cabinet;
    an interior temperature sensor disposed in said cabinet;
    an exterior temperature sensor disposed outside of said cabinet in proximity thereto;
    a communication unit connected to said interior temperature sensor and said exterior temperature sensor via a short-range communication connection; and
    a data processor connectable to said communication unit, said data processor configured to carry out the method according to claim 1.

8. A method for ascertaining a risk of condensation in a cabinet of a high-voltage device, which comprises the steps of:
    ascertaining a cabinet interior temperature in the cabinet by obtaining interior temperature values TI by an interior temperature sensor disposed in the cabinet;
    ascertaining an exterior temperature of the cabinet by obtaining exterior temperature values TA by an exterior temperature sensor disposed outside the cabinet;
    transmitting the interior temperature values TI and the exterior temperature values TA to a data processor;
    calculating, via the data processor, a difference between the interior temperature values TI and the exterior temperature values TA to ascertain a temperature difference value TD according to TD=TI−TA;
    ascertaining, via the data processor, a change in temperature difference values TD as a function of time;
    generating, via the data processor, a warning signal if the temperature difference value TD is below 3 degrees Celsius; and
    detecting, via the data processor, a failure of a heating device disposed in the cabinet if the temperature difference value TD drops below 3 degrees Celsius within a period of time of more than three minutes.

9. A method for ascertaining a risk of condensation in a cabinet of a high-voltage device, which comprises the steps of:
    ascertaining a cabinet interior temperature in the cabinet by obtaining interior temperature values TI by an interior temperature sensor disposed in the cabinet;
    ascertaining an exterior temperature of the cabinet by obtaining exterior temperature values TA by an exterior temperature sensor disposed outside the cabinet;
    transmitting the interior temperature values TI and the exterior temperature values TA to a data processor;
    calculating, via the data processor, a difference between the interior temperature values TI and the exterior temperature values TA to ascertain a temperature difference value TD according to TD=TI−TA;

generating, via the data processor, a warning signal if the temperature difference value TD is below 3 degrees Celsius; and concluding, via the data processor, that an additional heating device of the cabinet has failed, and delivering a corresponding warning signal, in an event of an exterior temperature value TA being below −33 degrees Celsius and an interior temperature value TI being less than −30 degrees Celsius.

10. A non-transitory storage medium storing computer executable instruction for performing a method for ascertaining a risk of condensation in a cabinet of a high-voltage device, the method comprises the steps of:

ascertaining a cabinet interior temperature in the cabinet by obtaining interior temperature values TI by an interior temperature sensor disposed in the cabinet;

ascertaining an exterior temperature of the cabinet by obtaining exterior temperature values TA by an exterior temperature sensor disposed outside the cabinet;

transmitting the interior temperature values TI and the exterior temperature values TA to a data processor;

calculating, via the data processor, a difference between the interior temperature values TI and the exterior temperature values TA to ascertain a temperature difference value TD according to TD=TI−TA; and generating, via the data processor, a warning signal if the temperature difference value TD is below 3 degrees Celsius, wherein the data processor detects a state of an open cabinet door if the temperature difference value TD drops below 3 degrees Celsius within 1 to 3 minutes.

* * * * *